(12) United States Patent
Chen et al.

(10) Patent No.: US 11,818,345 B2
(45) Date of Patent: Nov. 14, 2023

(54) BITRATE-ADAPTIVE SEGMENTATION FOR VIDEO TRANSCODING

(71) Applicant: GOOGLE LLC, Mountain View, CA (US)

(72) Inventors: Di Chen, Sunnyvale, CA (US); Sam John, Dublin, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/696,760

(22) Filed: Mar. 16, 2022

(65) Prior Publication Data
US 2023/0300330 A1   Sep. 21, 2023

(51) Int. Cl.
*H04N 19/119*   (2014.01)
*H04N 19/146*   (2014.01)
*H04N 19/159*   (2014.01)

(52) U.S. Cl.
CPC ......... *H04N 19/119* (2014.11); *H04N 19/146* (2014.11); *H04N 19/159* (2014.11)

(58) Field of Classification Search
CPC ... H04N 19/119; H04N 19/146; H04N 19/159
See application file for complete search history.

(56) References Cited

U.S. PATENT DOCUMENTS

2021/0076045 A1*   3/2021   Xue ................. H04N 19/14

* cited by examiner

*Primary Examiner* — Nam D Pham
(74) *Attorney, Agent, or Firm* — Young Basile Hanlon & MacFarlane, P.C.

(57) ABSTRACT

Bitrate-adaptive segmentation is performed for transcoding a video stream uploaded to an online video platform for hosting and later playback to platform users. The video stream is segmented into chunks based on prediction-based bit costs determined for frames of the video stream rather than based on scene changes detected within the video stream. The bitrate-adaptive segmentation includes determining inter-prediction bit costs and intra-prediction bit costs for frames of the video stream based on information indicated within a pass log based on a first pass encoding of the video stream, determining chunk boundaries for segmenting the video stream into a chunk based on the inter-prediction bit costs and the intra-prediction bit costs for the frames, and transcoding the chunk to produce a transcoded video stream.

20 Claims, 9 Drawing Sheets

BITRATE-ADAPTIVE SEGMENTATION FOR VIDEO TRANSCODING

BACKGROUND

Digital video streams may represent video using a sequence of frames or still images. Digital video can be used for various applications including, for example, video conferencing, high definition video entertainment, video advertisements, or sharing of user generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for bitrate-adaptive segmentation for video transcoding.

A method according to an implementation of this disclosure comprises receiving a video stream uploaded to an online video platform, determining inter-prediction bit costs and intra-prediction bit costs for frames of the video stream based on information indicated within a pass log based on a first pass encoding of the video stream, determining chunk boundaries for segmenting the video stream into a chunk based on the inter-prediction bit costs and the intra-prediction bit costs for the frames, and transcoding the chunk to produce a transcoded video stream.

An apparatus according to another implementation of this disclosure comprises a memory and a processor configured to execute instructions stored in the memory to determine prediction-based bit costs for frames of a video stream uploaded to an online video platform, determine chunk boundaries for a chunk of the video stream based on the prediction-based bit costs, and segment the video stream into the chunk according to the chunk boundaries.

A non-transitory computer readable storage device according to yet another implementation of this disclosure includes program instructions that, when executed by a processor, cause the processor to perform operations. The operations comprise determining chunk boundaries for a chunk of a video stream based on prediction-based bit costs determined for frames of the video stream, segmenting the video stream into the chunk, and transcoding the chunk to produce a transcoded video stream.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
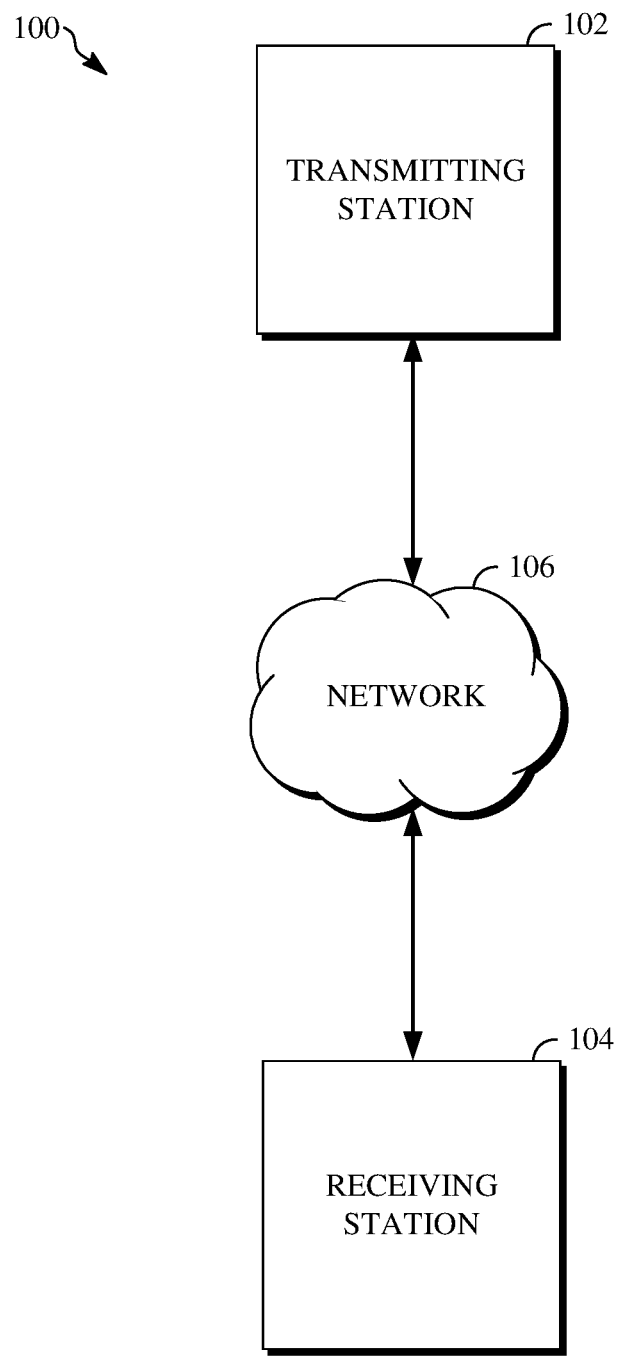
FIG. 1 is a schematic of an example of a video platform system.

Online video platforms, such as YouTube, process input video streams uploaded to them for hosting and later on-demand viewing by transcoding the videos into multiple target resolutions. For example, a video received at a resolution of 1080p may be transcoded into 360p, 480p, 720p, and possibly other resolution formats. When a user of such an online video platform requests to view a hosted video, the platform selects a target format to serve to the user based on input criteria such as network conditions and user device capabilities. In some cases, the platform may select the target format expected to deliver the highest quality of the video to the user based on those input criteria. For example, where a user's network conditions and user device capabilities support a 1080p resolution format of a video, the online video platform may serve that format version. This is because the higher resolution is associated with a higher playback quality and further because the relatively high bitrate requirements required to support playback at that resolution are attainable by the user's network conditions and user device capabilities.

Typically, transcoding includes splitting an input video stream into smaller segments, referred to as chunks, independently transcoding those chunks, and then merging the transcoded chunks together. The location and size of the chunks affect the overall compression efficiency and hence the streaming bandwidth of the subject video. As such, the efficacy of the transcoding process and thus of the input video stream processing altogether is based in part on how well the input video stream is segmented. Conventional transcoding approaches use a scene change-based technique to split an input video stream into chunks based on where scene changes occur throughout the input video stream. A scene change in such a context generally refers to a partial or complete change of at least a threshold amount of video data between consecutive frames For example, a scene change may refer to a first frame in a display order of the input video stream showing certain video content and a second frame immediately following the first frame in the display order showing entirely different video content. In another example, a scene change may refer to a change in camera motion, a camera flash, a change in brightness, a fade in/out, or something else involving the luminance and/or chrominance planes of the video stream. A conventional transcoding approach may thus segment an input video stream according to the scene changes identified within the input video stream. For input video streams which do not include scene changes or for which scene changes occur infrequently, such conventional transcoding approaches may segment the input video stream into chunks at a discrete time interval, for example, once every N (e.g., 5) seconds.

However, scene change-based segmentation techniques suffer drawbacks in that rate-distortion performance resulting therefrom is typically poor due to multiple reasons. First, as mentioned above, scene change-based segmentation techniques rely upon there being scene changes within an input video stream. Where scene changes are not identified or otherwise occur infrequently, such techniques segment the video on a temporal basis (e.g., 5 second intervals); however, segmentation purely on a temporal basis does not contemplate the video data, and so transcoding performance is generally poor in these cases. Second, scene change-based segmentation techniques do not work well where scene changes occur too frequently as small chunk sizes require more frequent compute processing during video playback and thus can either introduce undesirable latency or consume more compute resources than would otherwise be necessary. Third, scene change-based segmentation techniques do not consider bitrate at all and thus segment input video streams into chunks regardless of things like rate or distortion. For at least these reasons, conventional transcoding approaches using scene change-based techniques may result in bitrate fluctuations affecting the buffering and timing of video data.

Implementations of this disclosure address problems such as these using bitrate-adaptive segmentation for video transcoding. Bitrate-adaptive segmentation for video transcoding according to the implementations of this disclosure includes using a shortest path search to analyze bitrate costs for possible chunk boundaries through an input video stream in a scalable way. For example, bitrate-adaptive segmentation for video transcoding according to one or more implementations of this disclosure may include receiving a video stream uploaded to an online video platform, determining prediction-based bit costs for frames of the video stream, determining frame boundaries for chunks of the video stream based on the inter bit costs and the intra bit costs, and segmenting the video stream for encoding according to the frame boundaries. Bitrate-adaptive segmentation for video transcoding according to the implementations of this disclosure provides improvements over scene change-based segmentation techniques by minimizing the overall file size for input video streams, minimizing streaming bandwidth requirements for input video streams, reducing bitrate fluctuations within chunks during playback for input video streams, and increasing playback quality for input video streams.

Further details of techniques for bitrate-adaptive segmentation for video transcoding are described herein with initial reference to a system in which such techniques can be implemented. FIG. 1 is a schematic of an example of a video platform system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for the uploading, processing, and/or viewing of a video stream. Specifically, the video stream can be uploaded from the transmitting station 102 and viewed at the receiving station 106 after processing. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
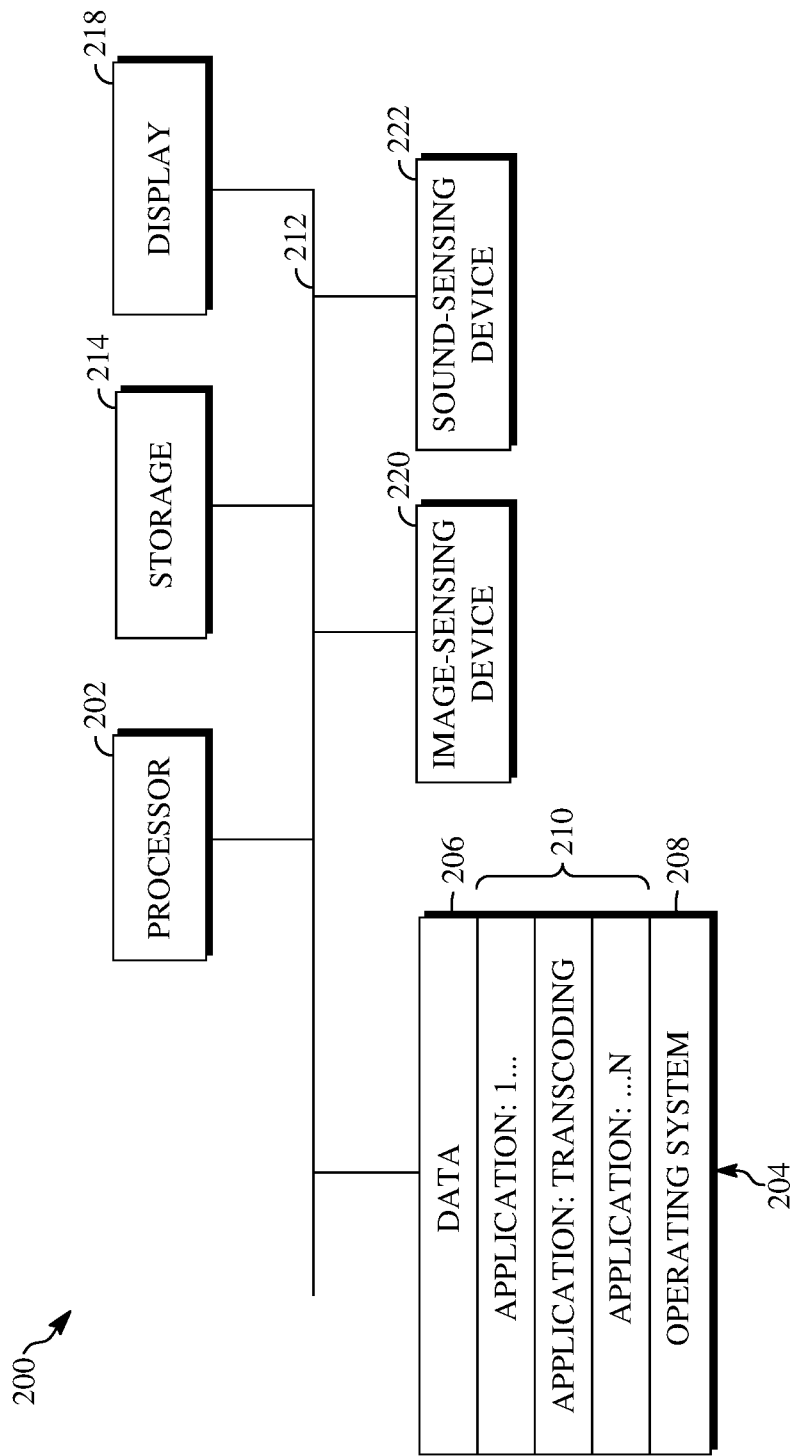
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video platform system 100 are possible. For example, an implementation can omit the network 104. In another implementation, a video stream can be uploaded from the transmitting station 102 and then stored for transmission at a later time to the receiving station 106 or any other device having memory. In one implementation, the receiving station 106 receives (e.g., via the network 104, a computer bus, and/or some communication pathway) and stores the processed video stream for later viewing. In an example implementation, a real-time transport protocol (RTP) is used for transmission of the processed video over the network 104. In another implementation, a transport protocol other than RTP may be used (e.g., a Hypertext Transfer Protocol-based (HTTP-based) video streaming protocol).

In some cases, the transmitting station 102 may be a device of a video uploader and the receiving station 106 may be a server of an online video platform. In some cases, the transmitting station 102 may be a server of an online video platform and the receiving station 106 may be a device of a person viewing videos at the online video platform. In some cases, the transmitting station 102 may be a device of a video uploader and the receiving station 106 may be a device of a person viewing videos at an online video platform, such as where a server of the online video platform is intermediary thereto.

FIG. 2 is a block diagram of an example of a computing device 200 that can implement a transmitting station or a receiving station. For example, a computing device such as the computing device 200 can implement the transmitting station 102 and/or the receiving station 106 shown in FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which include a transcoding application that performs some or all of the techniques disclosed herein.

The computing device 200 can also include a secondary storage 214, which can, for example, be a memory card used with a mobile computing device. Because video may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. For example, the operations of the processor 202 can be distributed across multiple machines (wherein individual machines can have one or more processors) that can be coupled directly or across a local area or other network. In another example, the memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
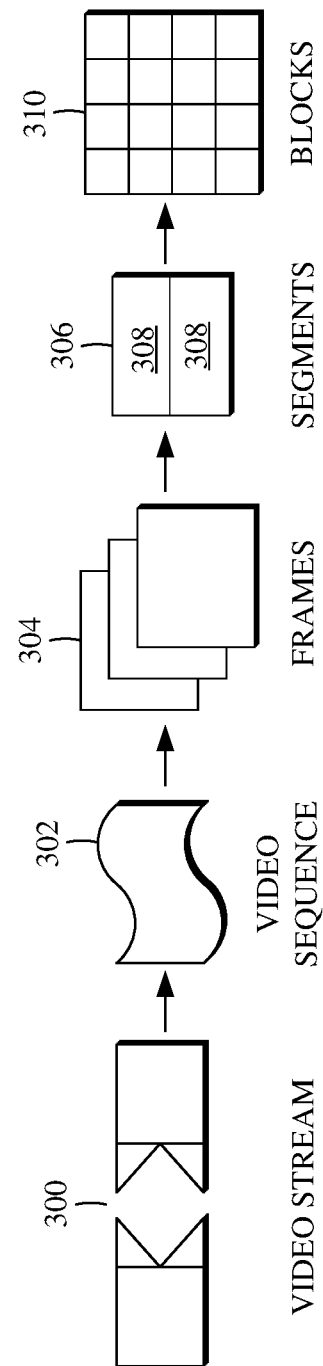
FIG. 3 is a diagram of an example of a video stream which may be uploaded to and processed at an online video platform.

FIG. 3 is a diagram of an example of a video stream 300 which may be uploaded to and processed at an online video platform. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
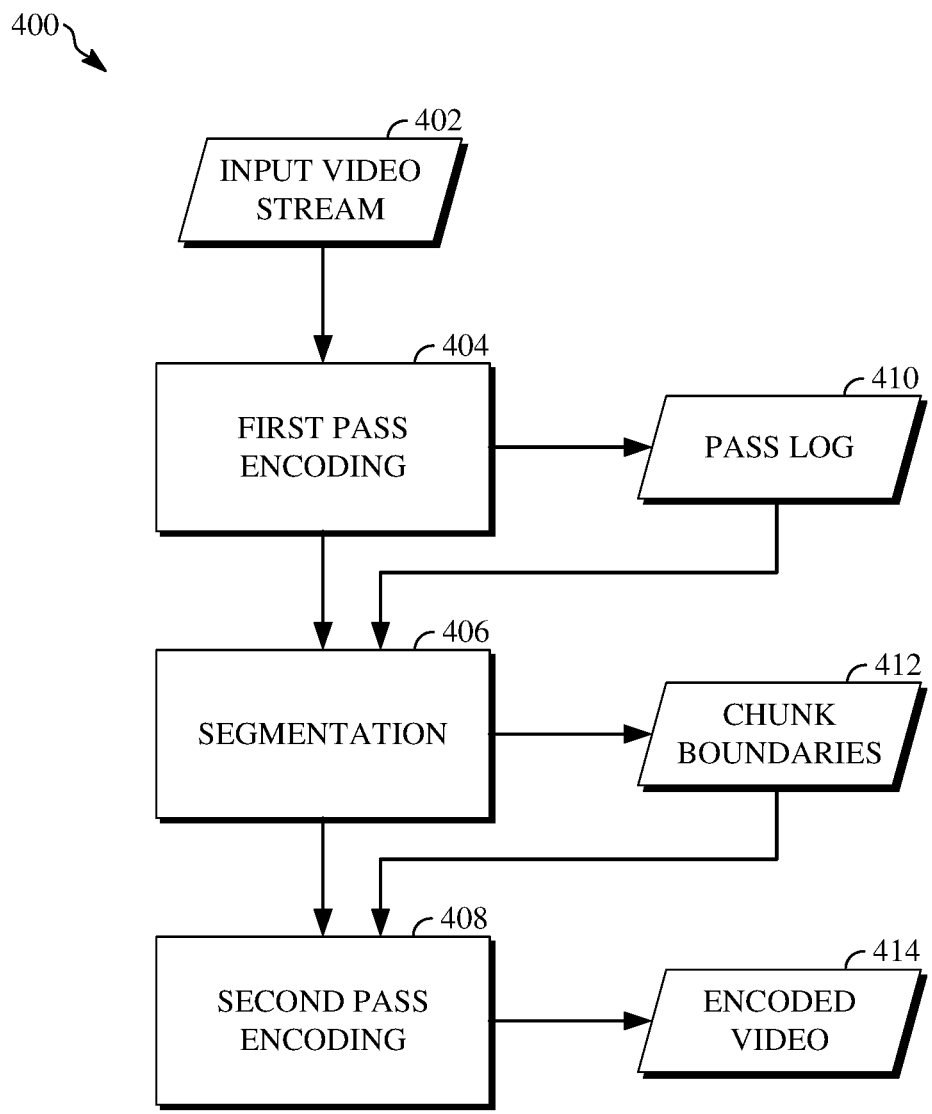
FIG. 4 is a block diagram of an example of a video stream processing system.

FIG. 4 is a block diagram of an example of a video stream processing system 400. The video stream processing system 400 can be implemented in a server of an online video platform, as described above, such as in the transmitting station 102 or the receiving station 106 shown in FIG. 1, such as by providing a computer software program stored in memory, for example, the memory 204 shown in FIG. 2. The computer software program can include machine instructions that, when executed by a processor such as the processor 202 shown in FIG. 2, cause the server to process an input video stream 402 in the manner described in FIG. 4. The video stream processing system 400 can also be implemented as specialized hardware included in, for example, the transmitting station 102 or the receiving station 106.

The input video stream 402 is a video stream, such as the video stream 300 shown in FIG. 3, which includes video content and is received from a device of a video uploader. The video stream processing system 400 includes components for processing the input video stream 402, including a first pass encoding stage 404, a segmentation stage 406, and a second pass encoding stage 408. The processing of the input video stream 402 via the stages 404 through 408 may be part of a transcoding process involved in the uploading of the input video stream 402 to an online video platform. For example, the video stream processing system 400 may be a video transcoding system.

The first pass encoding stage 404 processes frames of the input video stream 402 to produce a pass log 410. The pass log 410 indicates certain information associated with the input video stream 402 as determined during a first pass encoding of the input video stream 402. In particular, the pass log 410 may indicate prediction residual errors determined for individual frames of the input video stream 402 based on intra-prediction and/or inter-prediction operations performed against those frames during the first pass encoding at the first pass encoding stage 404. As such, for a given frame of the input video stream 402, the pass log 410 may include prediction residual error data usable to determine an intra bit cost and/or an inter bit cost. An intra bit cost, also referred to as an intra-prediction bit cost, refers to the number of bits required for the prediction residual error for a given frame when that frame is encoded using intra-prediction. An inter bit cost, also referred to as an inter-prediction bit cost, refers to the number of bits required for the prediction residual error for a given frame when that frame is encoded using inter-prediction.

The segmentation stage 406 uses the input video stream 402 and the pass log 410 to determine chunk boundaries 412 for the input video stream. The chunk boundaries identify pairs of frames of the input video stream 402 in which each pair includes a starting frame and an ending frame such that a chunk of the input video stream 402 is determined to be from the starting frame to the ending frame, inclusive. For a given chunk to be segmented from the input video stream 402, the segmentation stage 406 evaluates certain frames of the input video stream 402 to determine chunk boundary candidates and determines the chunk boundaries 412 from amongst those candidates. In particular, the segmentation stage 406 uses a shortest path search to analyze the bit costs for the chunk boundary candidates in a scalable way with log(N) complexity (e.g., O((|E|+|V|)*log(V)) complexity by using binary heap, where V is the number of possible chunk boundaries and E is the number of resulting chunks therefrom). Thus, rather than segment the input video stream 402 into chunks based on scene changes as has been conventional in the art, the segmentation stage 406 evaluates chunk segmentations based on bit costs (e.g., bit sizes). Implementations and examples of the segmentation stage 406 are further described below with respect to FIG. 5.

The second pass encoding stage 408 processes the frames of the input video stream 402 according to the chunk boundaries 412 to output an encoded video 414. The chunk boundaries 412 indicate how to segment the input video stream 408 into chunks, and each chunk is encoded to produce the encoded video 414. The encoded video 414 is then stored at the online video platform until on-demand playback by a user of the online video platform is requested. Upon such a request, the online video platform decodes the encoded video 414 on a chunk-basis to provide the decoded chunks for output during playback. In some cases, the second pass encoding stage 408 may also convert the encoded video 414 or the input video stream 402 from a first format to a second format or otherwise prepare multiple formats of the subject video, change a bitrate for the encoded video 414 or the input video stream 402 from a first bitrate to a second bitrate or otherwise prepare multiple bitrate versions of the subject video, change a resolution of the encoded video 414 or the input video stream 402 from first resolution to a second resolution or otherwise prepare multiple resolution versions of the video, a combination thereof, or the like.

In some implementations, one or more processes of the video stream processing system 400 may be performed at a mezzanine stage of an online video platform. For example, a mezzanine stage may be an intermediate stage for video encoding in which data is collected and/or processed before the ultimate encoding is performed. In some such implementations, the segmentation stage 406 and/or the first pass encoding stage 404 may be included in a mezzanine stage of the video stream processing system 400. For example, the pass log 410, the chunk boundaries 412, or both may represent output of the mezzanine stage. Where a mezzanine stage is so used, the pass log 410 may be an encoder pass log or a transcoder mezzanine log.

Figure 5:
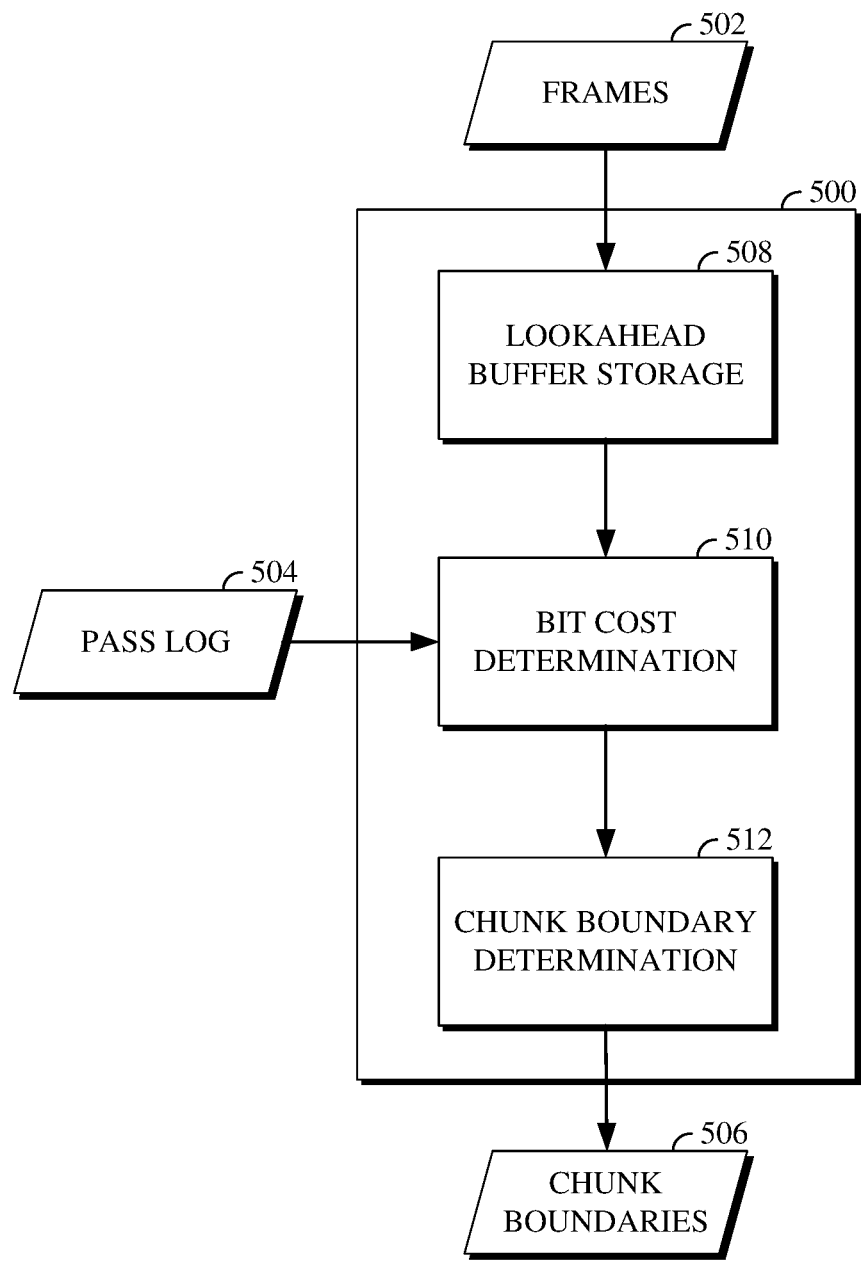
FIG. 5 is a block diagram of an example of a segmentation stage of a video stream processing system.

FIG. 5 is a block diagram of an example of a segmentation stage 500 of a video stream processing system, which may, for example, be the segmentation stage 406 shown in FIG. 4. The segmentation stage 500 receives as input frames 502 and a pass log 504 and outputs chunk boundaries 506. The frames 502 are frames of an input video stream, for example, the input video stream 402 shown in FIG. 4. The pass log 504 may, for example, be the pass log 410 shown in FIG. 4. The chunk boundaries 506 may, for example, be the chunk boundaries 412 shown in FIG. 4.

The segmentation stage 500 includes a lookahead buffer storage stage 508, a bit cost determination stage 510, and a chunk boundary determination stage 512. The lookahead buffer storage stage 508 stores some number of the frames 502 in a lookahead buffer for adaptive chunking. The number of frames 502 stored in the lookahead buffer at a given time may correspond to a size of a sliding window for the frames 502. The size of the sliding window may be based on a maximum chunk size threshold (e.g., five frames) defined for the segmentation. The lookahead buffer may have a static or dynamic size. For example, the size of the lookahead buffer may be twice the size of the sliding window. In another example, and to the extent different, the size of the lookahead buffer may be twice the size of the maximum chunk size threshold. In some implementations, a buffer other than a lookahead buffer may be used.

The bit cost determination stage 510 determines prediction-based bit costs for chunk boundary candidates, which are frames stored in the lookahead buffer. The prediction-based bit costs refer to bit sizes of prediction residual errors resulting from prediction operations performed against frames stored in the lookahead buffer. The bit cost determination stage 510 can use information indicated within the pass log 504 to determine the prediction-based bit costs. For example, the pass log 504 may indicate prediction residual error data indicating bit sizes of prediction residual errors for the frames stored in the lookahead buffer.

The prediction residual error data corresponding to a given frame stored in the lookahead buffer may indicate an intra bit cost and/or an inter bit cost for the frame. For example, where only intra-prediction was performed for a given frame during a first pass encoding, the pass log 504, which results from that first pass encoding, may indicate prediction residual error data for the given frame usable only to determine an intra bit cost for the given frame. Alternatively, where only inter-prediction was performed for the given frame during the first pass encoding, the pass log 504 may indicate prediction residual error data for the given frame usable only to determine an inter bit cost for the given frame. As a further alternative, where intra-prediction and inter-prediction were both performed for the given frame during the first pass encoding, the pass log 504 may indicate prediction residual error data for the given frame usable to determine both of an intra bit cost and an inter bit cost for the given frame.

Determining an intra bit cost or an inter bit cost based on the prediction residual error data for a given frame includes processing the prediction residual error data to determine a bit size of the prediction residual error resulting from a subject prediction operation performed against the given frame during the first pass encoding. In some cases, the prediction residual error data indicated in the pass log 504 may explicitly specify the intra bit cost and/or the inter bit cost for the given frame. In other cases, the prediction residual error data can be modeled against historical prediction residual error data (e.g., by inferencing against the current prediction residual error data using a machine learning model trained to estimate intra bit costs and/or inter bit costs based on sets of historical prediction residual error data) to determine the intra bit cost and/or the inter bit cost for the given frame. For example, different machine learning models can be trained based on prediction residual information for different codecs to accommodate different modeling processes. In some implementations, the pass log 504 may explicitly specify the intra bit costs and inter bit costs for the frames 502 independent of any prediction residual error data (e.g., where the pass log 504 omits such prediction residual error data).

Where both of an intra bit cost and an inter bit cost can be determined for a given frame based on the prediction residual error data indicated in the pass log 504 (e.g., where both of intra- and inter-prediction operations were performed against the given frame during the first pass encoding), the bit cost determination stage 510 uses those intra and inter bit costs as the prediction-based bit costs for the given frame. However, where only one of an intra bit cost or an inter bit cost can be determined for a given frame, the bit cost determination stage 510 predicts the missing bit cost for the given frame.

Predicting an inter bit cost for a given frame for which only an intra bit cost is available based on the pass log 504 includes determining a mean value of inter bit costs for other frames nearby the given frame in a display order of the video stream. For example, a frame for which only an intra bit cost is available based on the pass log 504 may be an I-frame which was encoded only using intra-prediction during the first pass encoding. One or more (e.g., two to four) other frames nearby the I-frame (e.g., following and/or preceding the I-frame) in the display order of the input video stream may be P-frames or B-frames for which inter bit costs are available based on the pass log 504 based on those P-frames or B-frames having been encoded using inter-prediction during the first pass encoding. The inter bit cost for the I-frame may thus be predicted based on the mean value of inter bit costs for one or both of P-frames or B-frames nearby the I-frame in the display order of the input video stream.

Predicting an intra bit cost for a given frame for which only an inter bit cost is available based on the pass log 504 includes identifying the nearest frame to the given frame in the display order of the input video stream for which an intra bit cost is available based on the pass log 504 and determining the intra bit cost for the given frame based on that intra bit cost. For example, a frame for which only an inter bit cost is available based on the pass log 504 may be a P-frame or B-frame which was encoded only using inter-prediction during the first pass encoding. A frame nearby the P-frame or B-frame (e.g., following and/or preceding the P-frame or B-frame) in the display order of the input video stream may be an I-frame for which an inter bit cost is available based on the pass log 504 based on that I-frame having been encoded using intra-prediction during the first pass encoding. The intra bit cost for the P-frame or B-frame may thus be predicted based on an intra bit cost for an I-frame nearest to the P-frame or B-frame in the display order of the input video stream.

In some implementations, the chunk boundary candidates may be limited to a subset of the frames stored in the lookahead buffer. For example, a subset of the frames stored in the lookahead buffer which satisfy one or more conditions may be identified as the chunk boundary candidates. In some such implementations, the one or more conditions may relate to a ratio of prediction residual errors for frames stored in the lookahead buffer. For example, a frame stored in the lookahead buffer may be identified as a chunk boundary candidate where the frame satisfies the condition $E_i/E_p < E_T$, in which $E_i$ is the prediction residual error resulting from an intra-prediction of the frame, $E_p$ is the prediction residual error resulting from an inter-prediction of the frame, and $E_T$ is a threshold. The value of the threshold may, for example, be empirically determined. Where a frame stored in the lookahead buffer is not identified as a chunk boundary candidate (e.g., where the frame does not satisfy the condition $E_i/E_p < E_T$), the frame will not be identified as a chunk boundary candidate, and, as a result, the bit cost determination stage 510 will not determine prediction-based bit costs for that frame.

The chunk boundary determination stage 512 determines the chunk boundaries 412 based on the prediction-based bit costs for the chunk boundary candidates. In particular, the chunk boundary determination stage 512 determines edges for pairs of frames identified as chunk boundary candidates, processes the inter bit costs and intra bit costs for the frames of the frame pairs to determine weight costs for the subject edges, and determines the lowest one of those weighted costs. The chunk boundary candidates corresponding to that lowest weighted cost are then output as the chunk boundaries 506 for the subject chunk.

For each frame pair connected by an edge, one frame is a starting chunk boundary candidate and the other is an ending chunk boundary candidate. The starting chunk boundary candidate represents a potential first frame for a chunk to be segmented. The ending chunk boundary candidate represents a potential last frame for a chunk which began with the corresponding starting chunk boundary candidate. The weighted cost for a given frame pair represented by an edge thus represents the bit cost for a chunk that could result from the segmenting of the input video stream at those frames. In particular, the weighted cost $W_{ij}$ for a given frame pair $F_i$, as the starting chunk boundary candidate, and $F_j$, as the ending chunk boundary candidate, can be determined as the intra bit cost for $F_i$ plus the sum of inter bit costs for all frames between $F_i$ and $F_j$. The chunk boundary determination stage 512 can perform a shortest path search to determine the weighted costs and thus the lowest one of those weighted costs. For example, the shortest path search may be performed as a Dijkstra algorithm which solves for $W_{ij}$ where the value thereof is infinite under the conditions that $j$ minus $i$ is less than a minimum chunk size threshold, that $j$ minus $i$ is greater than a maximum chunk size threshold, and/or that the prediction residual error for $F_i$ divided by the prediction residual error for $F_j$ is less than a threshold.

Not all possible frame pairs have edges between them; rather, edges may only exist for frame pairs which meet minimum and maximum chunk size thresholds. In particular, an edge may only exist between frame pairs, and thus those frame pairs may only be considered as a potential chunk boundary, where the total number of frames between them, inclusive, is greater than or equal to a minimum chunk size threshold (e.g., three frames) and is less than or equal to a maximum chunk size threshold (e.g., five frames).

Figure 6:
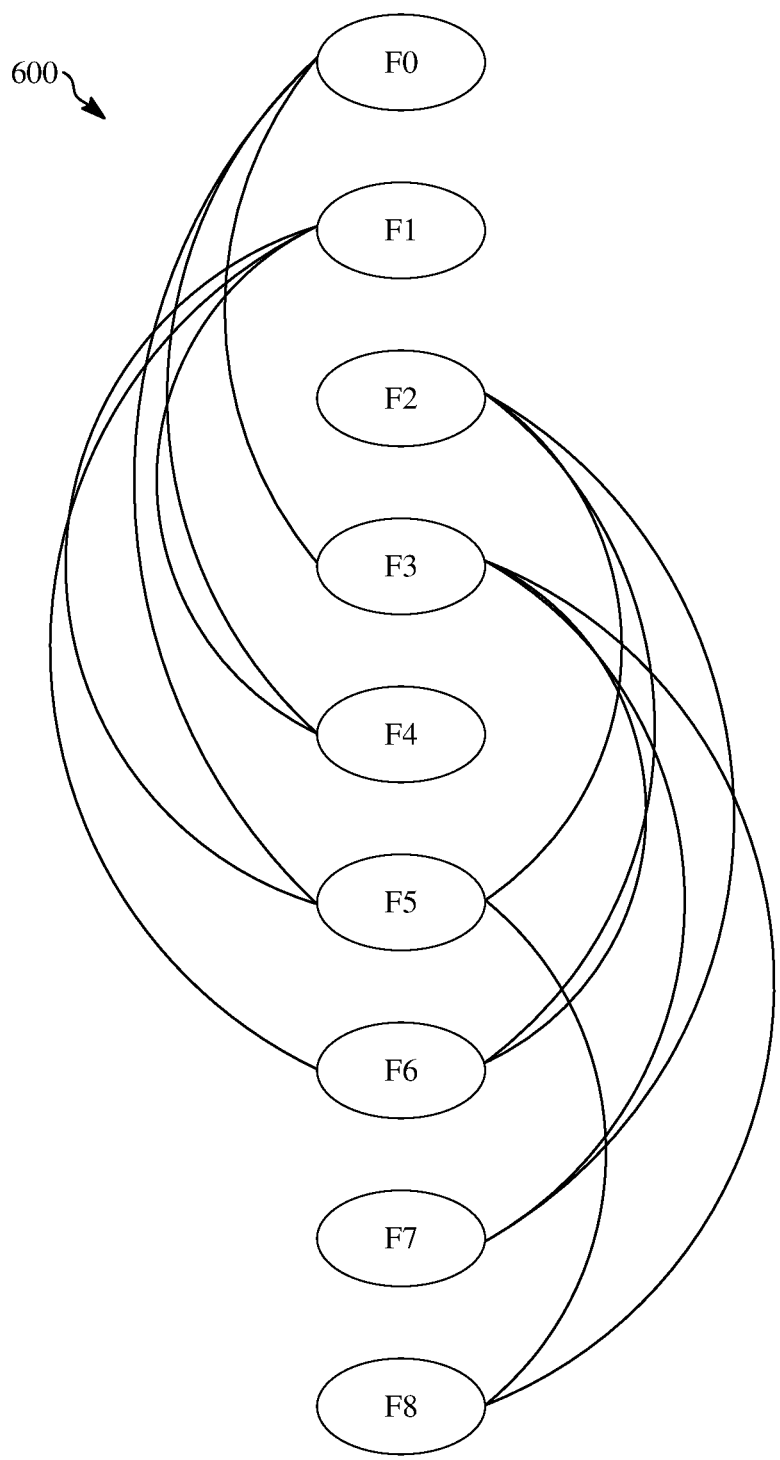
FIG. 6 is an illustration of an example of a set of chunk boundary candidates.

To illustrate at least some of the processing performed at the chunk boundary determination stage 512, reference is made to FIG. 6, which is an illustration of an example of a set of chunk boundary candidates 600. As shown, the set 600 is represented by an acyclic graph and includes nodes F0 through F8 representing frames which are stored in a lookahead buffer, for example, the lookahead buffer 508. The minimum chunk size may be set to three frames, and the maximum chunk size may be set to five frames.

The edges between the nodes represent the chunk boundary candidates in which a frame represented by a node at which an edge starts is a starting chunk boundary candidate and a frame represented by a node at which an edge ends is an ending chunk boundary candidate. For example, subject to the above minimum and maximum chunk sizes, where F1 is a starting chunk boundary candidate, F4, F5, and F6 are the potential ending chunk boundary candidates. In another example, and subject to those same size thresholds, where F3 is a starting chunk boundary candidate, F6, F7, and F8 are the potential ending chunk boundary candidates.

The illustration of the set 600 shows all of the possible ways for segmenting a set of frames of a video stream subject to minimum and maximum chunk size thresholds. A shortest path search is performed based on the edges between the nodes to minimize a weighted bit cost for the chunk to be segmented. In particular, a weighted bit cost $W_{ij}$ may represent the bit cost for the edge between the nodes representing the frame $F_i$, as the starting chunk boundary candidate, and $F_j$, as the ending chunk boundary candidate. The value of $W_{ij}$ may thus be estimated using the predicted bits for the chunk which would result from a segmentation between $F_i$ and $F_j$.

After the chunk boundaries 506 are determined for the frames identified as chunk boundary candidates, the sliding window used to identify the frames 502 is updated for use in determining chunk boundary candidates for a next chunk. As mentioned above, the sliding window has a size corresponding to a number of frames (e.g., ten frames). For a first set of frames of the input video stream, the sliding window begins with the first frame in display order and ends with the Nth frame (e.g., tenth frame) in display order in which N is the size of the sliding window. To update the sliding window, the sliding window is moved to start at the frame identified as the ending chunk boundary for the last identified chunk.

For example, referring to the set 600 shown in FIG. 6, the frame F0 may be the first frame identified in the sliding window (e.g., because it is the first frame in the input video stream or the frame identified as the ending chunk boundary for the last identified chunk). The sliding window may be of a ten frame size and thus start at the frame F0 and go through a frame F9 (not shown). If the frame F3 is the ending chunk boundary for the last identified chunk (e.g., where the frame F0 is the starting chunk boundary therefor), the sliding window will be updated to now start at the frame F3 and go through a frame F12 (not shown). Thereafter, if the frame F7 is the ending chunk boundary for the next identified chunk, the sliding window will be updated to start at the frame F7 and go through a frame F16 (not shown). The sliding window update continues in this manner until all frames of the input video stream have been processed by the chunk boundary determination stage 512.

In some implementations, the weighted costs for edges between frame pairs may be determined based on both rate and distortion factors rather than based on bitrate alone. For example, the above equations describing how a weighted cost is determined for a given edge may be considered to use a value of zero for distortion. However, where the distortion value for some or all of an input video stream is known, the rate-distortion lagrangian cost can be minimized instead of just the predicted size of the chunk. In particular, for the rate-distortion lagrangian cost for a given edge, $C_{ij}$, can be represented as the product of a lagrangian constant and $W_{ij}$ plus the sum of the distortion values for all frames between $F_i$ and $F_j$.

The operations performed at the segmentation stage 500 are performed based on whole frames and prediction-based bit costs for frames. As such, the approaches described above are thus performed at the frame-level. However, in some implementations, the operations performed at the segmentation stage 500 may instead be performed at the block-level. For example, for a given frame, the total bit cost for the given frame can be determined as the sum of a first product of a number of intra-predicted blocks within the given frame and a number of bits per intra-predicted block and a second product of a number of inter-predicted blocks within the given frame and a number of bits per inter-predicted block. The total bit cost, number of intra-predicted blocks, and number of inter-predicted blocks may be indicated within the pass log 504. As such, the number of bits per intra-predicted block and number of bits per inter-predicted block can be solved using a least-squares regression.

Figure 7:
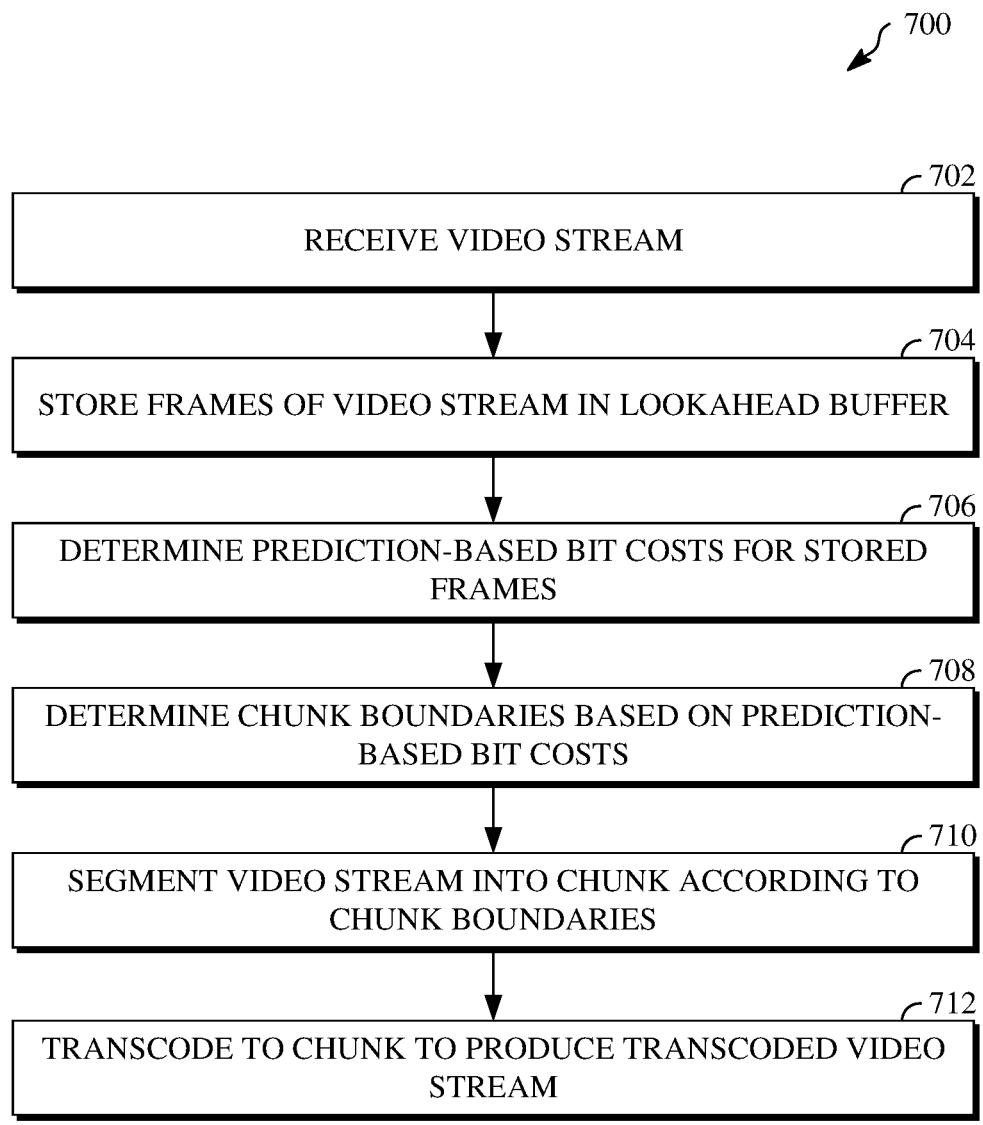
FIG. 7 is a flowchart diagram of an example of a technique for bitrate-adaptive segmentation for video transcoding.
Figure 8:
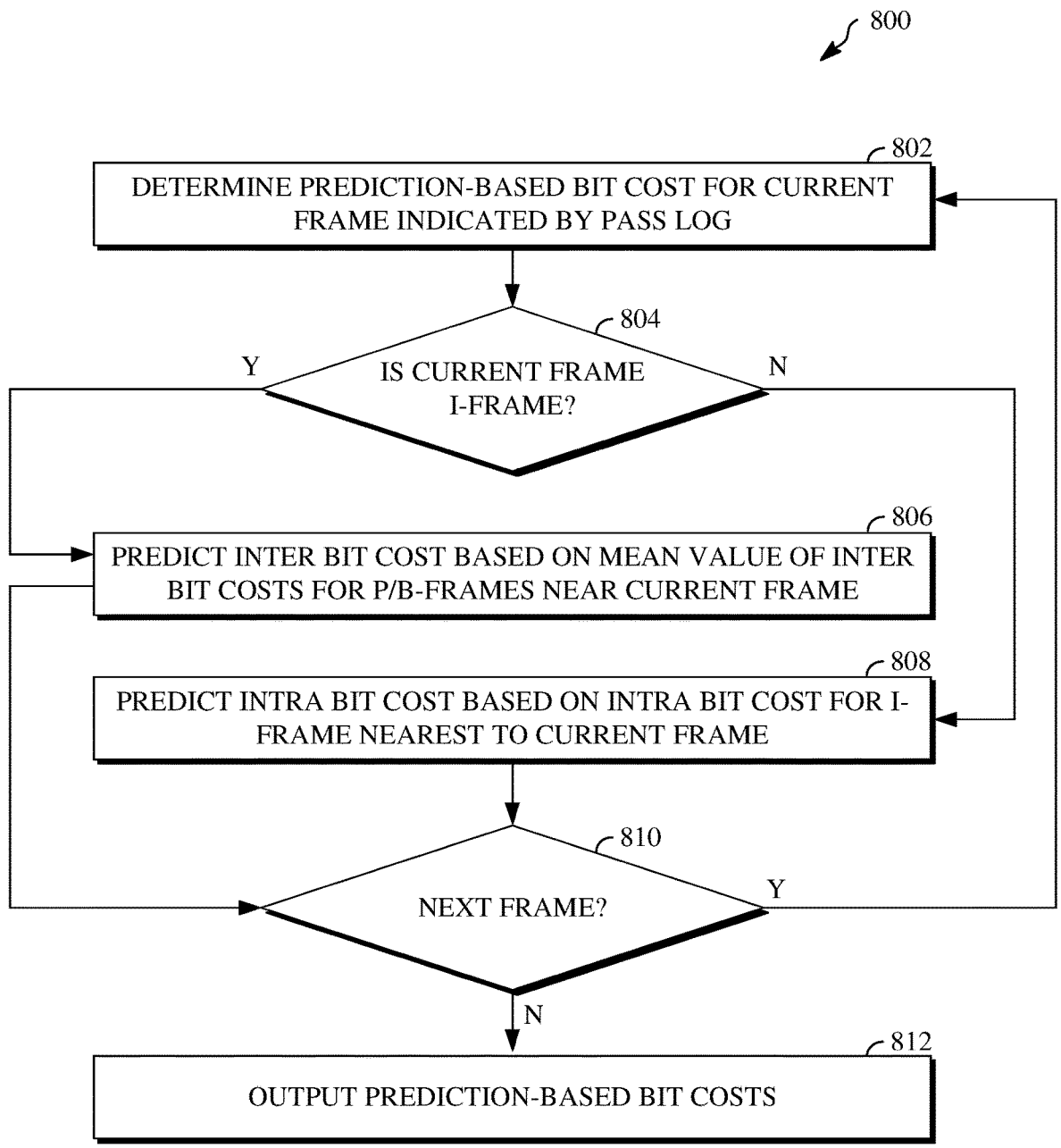
FIG. 8 is a flowchart diagram of an example of a technique for predicting prediction-based bit costs for bitrate-adaptive segmentation.
Figure 9:
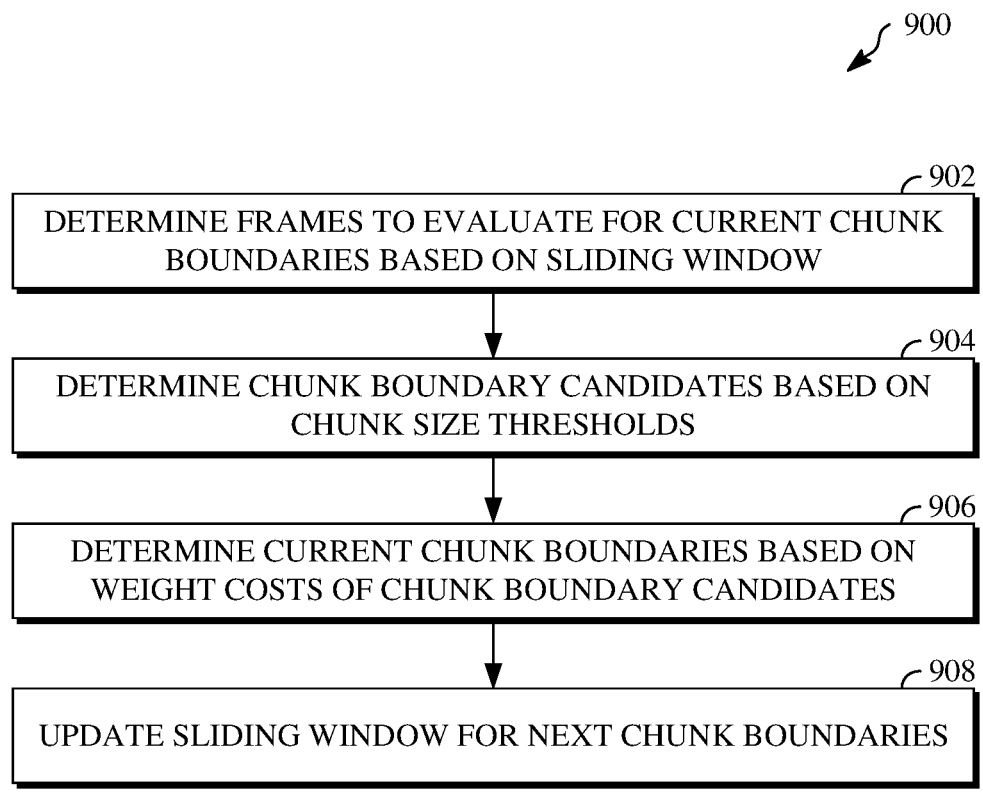
FIG. 9 is a flowchart diagram of an example of a technique for determining chunk boundaries for bitrate-adaptive segmentation.

Further details of techniques for bitrate-adaptive segmentation for video transcoding are now described. FIG. 7 is a flowchart diagram of an example of a technique 700 for bitrate-adaptive segmentation for video transcoding. FIG. 8 is a flowchart diagram of an example of a technique 800 for predicting prediction-based bit costs for bitrate-adaptive segmentation. FIG. 9 is a flowchart diagram of an example of a technique 900 for determining chunk boundaries for bitrate-adaptive segmentation.

The technique 700, the technique 800, and/or the technique 900 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 700, the technique 800, and/or the technique 900. The technique 700, the technique 800, and/or the technique 900 can be implemented using specialized hardware or firmware. For example, a hardware component configured to perform the technique 700, the technique 800, and/or the technique 900. As explained above, some computing devices may have multiple memories or processors, and the operations described in the technique 700, the technique 800, and/or the technique 900 can be distributed using multiple processors, memories, or both.

For simplicity of explanation, the technique 700, the technique 800, and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for bitrate-adaptive segmentation for video transcoding is shown. At 702, a video stream is received. The video stream may, for example, be received at an online video platform. The video stream may be a pre-recorded video which is uploaded to the online video platform for hosting such as through a website or application associated with the online video platform. Alternatively, the video stream may be a video recorded as it is being uploaded to the online video platform, such as for later, non-real-time playback to users of the online video platform.

At 704, frames of the video stream are stored in a lookahead buffer. In some cases, all of the frames of the video stream may be stored in the lookahead buffer concurrently. In other cases, a subset of the frames of the video stream may be stored in the lookahead buffer based on one or both of a size of the lookahead buffer or a size of a sliding window used for segmenting the video stream into chunks.

At 706, prediction-based bit costs are determined for the frames stored in the lookahead buffer. The prediction-based bit costs for a given frame stored in the lookahead buffer include an inter bit cost and an intra bit cost. Determining the prediction-based bit costs can include predicting one or more of the prediction-based bit costs based on information indicated within a pass log for the video stream. In particular, determining the prediction-based bit costs for the given frame can include determining one of the inter bit cost or the intra bit cost based on information indicated within a pass log and predicting the other based on one or more prediction-based bit costs for one or more frames nearby the given frame in a display order of the video stream. For example, for an intra-predicted frame of the frames, the pass log identifies an intra-prediction bit cost, and determining an inter-prediction bit cost for the intra-predicted frame based on the information indicated within the pass log includes predicting the inter-prediction bit cost based on a mean value of inter-prediction bit costs for inter-predicted frames of the frames nearby the intra-predicted frame in a display order of the video stream. As such, for each I-frame of the frames, an inter bit cost can be predicted based on a mean value of inter bit costs for one or both of P-frames or B-frames proximate to the I-frame in a display order of the video stream. In another example, for an inter-predicted frame of the frames, the pass log identifies an inter-prediction bit cost, and determining an intra-prediction bit cost for the inter-predicted frame based on the information indicated within the pass log includes predicting the intra-prediction bit cost based on an intra-prediction bit cost identified by the pass log for intra-predicted frame of the frames nearest to the inter-predicted frame in a display order of the video stream. As such, for each P-frame or B-frame of the frames, an intra bit cost can be predicted based on an intra bit cost for an I-frame nearest to the P-frame or the B-frame in the display order. In some implementations, the information indicated within the pass log corresponds to prediction residual error data, and predicting the one or more bit costs based on the information indicated within the pass log for the video stream includes inferring a prediction-based bit cost based on the prediction residual error data. In some implementations, the prediction is performed at a block-level. In some implementations, the pass long is an encoder pass log or a transcoder mezzanine log. Implementations and examples for predicting prediction-based bit costs are described below with respect to FIG. 8.

At 708, chunk boundaries are determined based on the prediction-based bit costs. Determining the chunk boundaries can include determining, for each pair of the frames that meets a minimum chunk size threshold and a maximum chunk size threshold, a weighted cost based on the intra-prediction bit cost for a first frame of the pair and a sum of the inter-prediction bit costs for all frames between the first frame and a second frame of the pair, and selecting, as the chunk boundaries, the pair of the frames corresponding to a lowest one of the weighted costs. For example, determining the chunk boundaries can include determining edges for pairs of the frames identified as chunk boundary candidates, determining weighted costs for the edges based on the prediction-based bit costs that are associated with the chunk boundary candidates, and selecting, as the chunk boundaries, the chunk boundary candidates having an edge corresponding to a lowest one of the weighted costs. Determining the edges for the pairs of the frames can include determining an edge between a pair of the frames based on the pair of the frames meeting one or more chunk size thresholds. In some cases, some or all of the frames that are stored in a lookahead buffer may be identified as the chunk boundary candidates. In some cases, a frame of the frames may be identified as a chunk boundary candidate where a prediction residual error resulting from an intra-prediction of the frame divided by a prediction residual error resulting from an inter-prediction of the frame is less than a threshold. Implementations and examples for determining chunk boundaries are described below with respect to FIG. 9.

At 710, the video stream is segmented according to the chunk boundaries. Segmenting the video stream according to the chunk boundaries includes designating a chunk of the video stream based on the chunk boundaries, identified by a starting frame and an ending frame. The processes described above are repeated for each chunk, including by identifying chunk boundaries for all chunks into which to segment the video stream. This may, for example, include updating a sliding window used for identifying chunk boundary candidates.

At 712, the chunk is transcoded to produce a transcoded video stream. In some cases, each chunk can be transcoded individually, such as responsive to the segmentation of the video stream according to the chunk boundaries for the chunk. In some cases, the entire video stream can be transcoded once some or all of the chunks have been segmented therefrom. The transcoded video stream is then stored at the online video platform for on-demand user playback.

Referring next to FIG. 8, the technique 800 for predicting prediction-based bit costs for bitrate-adaptive segmentation is shown. At 802, a prediction-based bit cost for a current frame as indicated by a pass log is determined.

At 804, a determination is made as to whether the current frame is an I-frame based on whether the prediction-based bit cost determined for the current frame is an intra bit cost or an inter bit cost.

At 806, based on a determination at 804 that the current frame is an I-frame, an inter bit cost is predicted for the current frame based on a mean value of inter bit costs for inter-predicted (e.g., P or B) frames nearby the current frame in a display order (e.g., within three to five frames of the current frame in the display order) of the video stream.

Separately, at 808, based on a determination at 804 that the current frame is not an I-frame, an intra bit cost is predicted for the current frame based on an intra bit cost for an intra-predicted (e.g., I) frame nearest to the current frame in the display order of the video stream (e.g., the I-frame preceding the current frame).

At 810, a determination is made as to whether there is a next frame for which to predict an inter bit cost or an intra bit cost. Based on a determination at 810 that there is a next frame, the technique 800 returns to 802 and repeats for the next frame as the new current frame.

Alternatively, at 812, based on a determination at 810 that there is no next frame, the prediction-based bit costs are output. In some cases, the technique 800 is performed for a subset of frames of the video stream, such as for frames stored in a lookahead buffer.

Referring finally to FIG. 9, the technique 900 for determining chunk boundaries for bitrate-adaptive segmentation is shown. At 902, frames to evaluate for current chunk boundaries are determined based on a sliding window. The sliding window includes frames stored within a lookahead buffer.

At 904, chunk boundary candidates are determined based on chunk size thresholds. The chunk size thresholds may, for example, include a minimum chunk size threshold and/or a maximum chunk size threshold. The chunk size thresholds may be set by default values or by modeling. For example, determining the chunk boundary candidates based on the chunk size thresholds can include identifying, as chunk boundary candidates, all frames to evaluate for which a prediction residual error resulting from an intra-prediction of the frame divided by a prediction residual error resulting from an inter-prediction of the frame is less than a threshold.

At 906, chunk boundaries are determined based on weighted costs associated with chunk boundary candidates. The weighted costs are determined for edges between pairs of frames identified as chunk boundary candidates in which a first frame of a given pair is a starting chunk boundary candidate and a second frame of the given pair is an ending chunk boundary candidate. The weighted costs are determined based on prediction-based bit costs determined for the frames of the pairs. In some implementations, the weighted costs may further be determined based on distortion values for the frames of the pairs. The pair of frames corresponding to the lowest one of the weighted costs are selected as the chunk boundaries.

At 908, the sliding window used to identify the frames to evaluate for the current chunk boundaries is updated. Updating the sliding window includes moving the sliding window so that the sliding window starts with the frame representing the end boundary of the chunk boundaries determined for the last chunk.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    receiving a video stream uploaded to an online video platform;
    determining inter-prediction bit costs and intra-prediction bit costs for frames of the video stream based on information indicated within a pass log based on a first pass encoding of the video stream;
    determining chunk boundaries for segmenting the video stream into a chunk by evaluating, for each pair of the frames that meets one or more chunk size thresholds, the inter-prediction bit costs and the intra-prediction bit costs corresponding to the pair of the frames; and
    transcoding the chunk to produce a transcoded video stream.

2. The method of claim 1, wherein the one or more chunk size thresholds includes a minimum chunk size threshold and a maximum chunk size threshold, wherein determining the chunk boundaries comprises:
    determining, for each pair of the frames that meets the minimum chunk size threshold and the maximum chunk size threshold, a weighted cost based on the intra-prediction bit cost for a first frame of the pair and a sum of the inter-prediction bit costs for all frames between the first frame and a second frame of the pair; and
    selecting, as the chunk boundaries, the pair of the frames corresponding to a lowest one of the weighted costs.

3. The method of claim 2, wherein the frames are identified within a sliding window, the method comprising:
    updating, based on the selection of the pair of the frames as the chunk boundaries, the sliding window to start at the second frame.

4. The method of claim 2, the method comprising:
    storing, prior to the determining of the inter-prediction bit costs and the intra-prediction bit costs, the frames in a lookahead buffer having a size greater than the maximum chunk size threshold; and
    determining, from amongst the frames stored in the lookahead buffer, the pairs of the frames that meet the minimum chunk size threshold and the maximum chunk size threshold.

5. The method of claim 1, wherein, for an intra-predicted frame of the frames, the pass log identifies an intra-prediction bit cost, and determining an inter-prediction bit cost for the intra-predicted frame based on the information indicated within the pass log comprises:
    predicting the inter-prediction bit cost based on a mean value of inter-prediction bit costs for inter-predicted frames of the frames nearby the intra-predicted frame in a display order of the video stream.

6. The method of claim 1, wherein, for an inter-predicted frame of the frames, the pass log identifies an inter-prediction bit cost, and determining an intra-prediction bit cost for the inter-predicted frame based on the information indicated within the pass log comprises:
  predicting the intra-prediction bit cost based on an intra-prediction bit cost identified by the pass log for intra-predicted frame of the frames nearest to the inter-predicted frame in a display order of the video stream.

7. An apparatus, comprising:
  a memory; and
  a processor configured to execute instructions stored in the memory to:
    determine prediction-based bit costs for frames of a video stream uploaded to an online video platform;
    determine chunk boundaries for a chunk of the video stream by evaluating, for each pair of the frames that meets one or more chunk size thresholds, the prediction-based bit costs corresponding to the pair of the frames; and
    segment the video stream into the chunk according to the chunk boundaries.

8. The apparatus of claim 7, wherein, to determine the prediction-based bit costs for the frames of the video stream, the processor is configured to execute the instructions to:
  predict one or more of the prediction-based bit costs based on information indicated within a pass log for the video stream.

9. The apparatus of claim 8, wherein, to predict the one or more bit costs based on the information indicated within the pass log for the video stream, the processor is configured to execute the instructions to:
  for each I-frame of the frames, predict an inter bit cost based on a mean value of inter bit costs for one or both of P-frames or B-frames proximate to the I-frame in a display order of the video stream; and
  for each P-frame or B-frame of the frames, predict an intra bit cost based on an intra bit cost for an I-frame nearest to the P-frame or the B-frame in the display order.

10. The apparatus of claim 8, wherein the information indicated within the pass log corresponds to prediction residual error data, and wherein, to predict the one or more bit costs based on the information indicated within the pass log for the video stream, the processor is configured to execute the instructions to:
  infer a prediction-based bit cost based on the prediction residual error data.

11. The apparatus of claim 8, wherein the prediction is performed at a block-level.

12. The apparatus of claim 8, wherein the pass log is an encoder pass log or a transcoder mezzanine log.

13. The apparatus of claim 7, wherein, to determine chunk boundaries for a chunk of the video stream, the processor is configured to execute the instructions to:
  determine, as chunk boundary candidates, edges for the pairs of the frames;
  determine weighted costs for the edges based on the prediction-based bit costs that are associated with the chunk boundary candidates; and
  select, as the chunk boundaries, the chunk boundary candidates having an edge corresponding to a lowest one of the weighted costs.

14. The apparatus of claim 13, wherein, to determine the edges for the pairs of the frames, the processor is configured to execute the instructions to:
  determine an edge between a pair of the frames based on the pair of the frames meeting the one or more chunk size thresholds.

15. The apparatus of claim 13, wherein the processor is configured to execute the instructions to:
  identify, as the chunk boundary candidates, ones of the frames that are stored in a lookahead buffer.

16. The apparatus of claim 13, wherein the processor is configured to execute the instructions to:
  identify, as a chunk boundary candidate, a frame of the frames for which a prediction residual error resulting from an intra-prediction of the frame divided by a prediction residual error resulting from an inter-prediction of the frame is less than a threshold.

17. A non-transitory computer readable storage device including program instructions that, when executed by a processor, cause the processor to perform operations, the operations comprising:
  determining chunk boundaries for segmenting a video stream into a chunk by evaluating, for each pair of frames of the video stream that meets one or more chunk size thresholds, prediction-based bit costs corresponding to the pair of the frames;
  segmenting the video stream into the chunk; and
  transcoding the chunk to produce a transcoded video stream.

18. The non-transitory computer readable storage device of claim 17, wherein the frames are a subset of frames of the video stream, the operations comprising:
  storing the frames within a lookahead buffer; and
  determining, for each frame stored within the lookahead buffer that is identified as a chunk boundary candidate, edges with other frames identified as chunk boundary candidates based on the one or more chunk size thresholds.

19. The non-transitory computer readable storage device of claim 18, wherein the operations for determining the chunk boundaries comprise:
  determining weighted costs for the edges based on the prediction-based costs; and
  selecting, as the chunk boundaries, the chunk boundary candidates having an edge corresponding to a lowest one of the weighted costs.

20. The non-transitory computer readable storage device of claim 19, wherein the prediction-based costs include an inter bit cost and an intra bit cost for each frame, the operations comprising:
  predicting, for frames for which inter bit costs are indicated within a pass log, intra bit costs based on nearest intra-predicted frames in a display order of the video stream; and
  predicting, for frames for which intra bit costs are indicated within the pass log, inter bit costs based on a mean value of inter bit costs for nearby inter-predicted frames in the display order.

* * * * *